(12) United States Patent
Park

(10) Patent No.: US 10,097,876 B2
(45) Date of Patent: Oct. 9, 2018

(54) APPARATUS AND METHOD FOR PROVIDING MEDIA SERVICES

(71) Applicant: HUMAX CO., LTD, Yongin (KR)

(72) Inventor: Sung Heum Park, Yongin (KR)

(73) Assignee: HUMAX CO., LTD., Yongin (KR)

( * ) Notice: Subject to any disclaimer, the term of this patent is extended or adjusted under 35 U.S.C. 154(b) by 77 days.

(21) Appl. No.: 15/255,050

(22) Filed: Sep. 1, 2016

(65) Prior Publication Data

US 2017/0302986 A1    Oct. 19, 2017

(30) Foreign Application Priority Data

Apr. 19, 2016    (KR) ........................ 10-2016-0047579

(51) Int. Cl.
*H04N 5/44* (2011.01)
*H04N 21/422* (2011.01)
(Continued)

(52) U.S. Cl.
CPC ..... *H04N 21/42212* (2013.01); *G06F 3/0383* (2013.01); *G06F 3/03545* (2013.01);
(Continued)

(58) Field of Classification Search
CPC ....... H04N 21/42212; H04N 21/42219; H04N 21/4222; H04N 21/482; H04N 21/47202; H04N 21/4355; H04N 21/42204; H04N 2005/4425; H04N 2005/4408; H04N 2005/443; H04N 2005/44569; H04N 5/4403; H04N 5/44582; H04N 5/44; H04N 5/23267; H04N 1/00384; H04N 1/00811;
(Continued)

(56) References Cited

U.S. PATENT DOCUMENTS

2003/0040834 A1* 2/2003 Coleman ............ G05B 19/4099
                                                                    700/191
2007/0035664 A1* 2/2007 Kamada ............. H04N 21/8456
                                                                    348/565

(Continued)

FOREIGN PATENT DOCUMENTS

KR    10-2007-0110114 A    11/2007
KR    10-2011-0107069 A     9/2011
(Continued)

*Primary Examiner* — Michael E Teitelbaum
*Assistant Examiner* — Mustafizur Rahman

(57) ABSTRACT

An embodiment of the invention provides an apparatus for providing a media service while outputting a content. The apparatus includes: a processor; a memory for storing one or more program instructions executed by the processor; and a control signal receiver unit for receiving from a remote control a control signal resulting from a key input made by a user, where the program instructions determine whether the key input is a normal input or a force input by comparing a sensing level, which is associated with a pressure or an area by which the user presses the key, with a preset value; identify the content outputted on the screen when the control signal is received, when the key input is a force input; and execute an operation different from an operation of a normal input for the key, according to a combination of the identified content and the force input.

20 Claims, 7 Drawing Sheets

(51) Int. Cl.
*H04N 21/482* (2011.01)
*H04N 21/472* (2011.01)
*G06F 3/038* (2013.01)
*G06F 3/041* (2006.01)
*H04N 21/431* (2011.01)
*H04N 21/4788* (2011.01)
*H04N 21/488* (2011.01)
*G06F 3/0488* (2013.01)
*G06F 3/0354* (2013.01)
*G08C 17/00* (2006.01)

(52) U.S. Cl.
CPC .......... *G06F 3/0414* (2013.01); *G06F 3/0416* (2013.01); *G06F 3/04883* (2013.01); *G08C 17/00* (2013.01); *H04N 5/4403* (2013.01); *H04N 21/42208* (2013.01); *H04N 21/42224* (2013.01); *H04N 21/4312* (2013.01); *H04N 21/4788* (2013.01); *H04N 21/47202* (2013.01); *H04N 21/482* (2013.01); *H04N 21/4882* (2013.01); *G08C 2201/30* (2013.01); *H04N 2005/4428* (2013.01)

(58) Field of Classification Search
CPC ......... H04N 2201/0075; H04N 19/162; H04N 21/42208; H04N 21/42224; H04N 21/4312; H04N 21/4788; H04N 21/4882; H04N 2005/4428; H04M 1/72533; G06F 3/048; G06F 3/033; G06F 3/03545; G06F 3/0383; G06F 3/0414; G06F 3/0416; G06F 3/04883; H04B 1/205; G08C 17/00; G08C 2201/30
USPC ....... 348/734, 706, 714, 719, 739, 523, 565, 348/567, 585, 590, 684, 425, 474, 211.14, 348/231.6, 231.1, 298, 43; 345/169, 173, 345/158, 160; 725/32, 39, 37, 43, 52, 61, 725/93
See application file for complete search history.

(56) References Cited

U.S. PATENT DOCUMENTS

| | | | | |
|---|---|---|---|---|
| 2007/0136748 A1* | 6/2007 | Rodriguez | .......... | H04N 21/235 725/37 |
| 2008/0109847 A1* | 5/2008 | Cho | ............. | G06F 3/0482 725/39 |
| 2008/0119233 A1* | 5/2008 | Lim | .............. | H04M 1/72583 455/564 |
| 2008/0276274 A1* | 11/2008 | Jerding | ............. | G06Q 30/06 725/38 |
| 2010/0097530 A1* | 4/2010 | Hasegawa | ............. | G08C 17/02 348/731 |
| 2011/0181782 A1* | 7/2011 | Ha | ............. | H04N 5/44591 348/569 |
| 2011/0317079 A1* | 12/2011 | McRae | ............. | H04N 21/4113 348/739 |
| 2011/0321090 A1* | 12/2011 | McRae | ............. | H04N 5/44543 725/39 |
| 2012/0090004 A1* | 4/2012 | Jeong | ............. | H04N 5/44513 725/39 |
| 2013/0215225 A1* | 8/2013 | Yun | ............. | H04N 13/0029 348/43 |
| 2013/0254798 A1* | 9/2013 | Kim | ............. | H04N 21/81 725/32 |
| 2013/0265236 A1* | 10/2013 | Jung | ............. | G06F 3/023 345/169 |
| 2013/0298169 A1* | 11/2013 | Wells | ............. | H04H 20/91 725/61 |
| 2013/0300944 A1* | 11/2013 | Lee | ............. | H04N 21/42228 348/734 |
| 2014/0152581 A1* | 6/2014 | Case | ............. | G06F 3/041 345/173 |
| 2014/0215380 A1* | 7/2014 | Kang | ............. | G06F 3/0483 715/781 |
| 2014/0218621 A1* | 8/2014 | Kim | ............. | H04N 5/4403 348/734 |
| 2015/0135080 A1* | 5/2015 | Ji | ............. | G06F 3/0416 715/728 |
| 2015/0135218 A1* | 5/2015 | You | ............. | H04N 21/4751 725/40 |
| 2015/0212591 A1* | 7/2015 | Strom | ............. | G06F 3/0202 345/169 |
| 2016/0179463 A1* | 6/2016 | Higa | ............. | G06F 3/167 725/52 |
| 2016/0313879 A1* | 10/2016 | Kim | ............. | G06F 3/0482 |
| 2017/0019622 A1* | 1/2017 | Yang | ............. | G06F 1/3209 |

FOREIGN PATENT DOCUMENTS

KR 10-2012-0064490 A 6/2012
KR 10-2015-0075010 A 7/2015

\* cited by examiner

APPARATUS AND METHOD FOR PROVIDING MEDIA SERVICES

PRIORITY

This application claims priority under 35 U.S.C. § 119(a) to a Korean patent application filed on Apr. 19, 2016 in the Korean Intellectual Property Office and assigned Serial No. 10-2016-0047579, the entire disclosure of which is incorporated herein by reference.

BACKGROUND

1. Field of the Invention

The present disclosure relates to an apparatus and a method for providing media services. More particularly, the present invention provides an apparatus and a method that allow the user to access various services even though only a small number of keys are provided on the remote control.

2. Description of the Related Art

A set-top box is a device that connects to a TV set and suitably converts video and voice signals received from the outside to display the contents via the TV set.

In addition to regular TV broadcast ground waves, the set-top box can receive signals such as IPTV, cable TV, or satellite TV signals, etc., for display on the TV set.

The set-top box is typically equipped with a remote control, which the user can manipulate to remotely control the set-top box.

As the types of content services provided via IPTV, cable TV, satellite TV, etc., are becoming more varied, so too have the functions provided by a set-top box or a TV set become more varied. This has also led to an increased number of keys provided on the remote control.

While it is desirable to provide the user with more varied contents and services, there is the inconvenience that the user has to know the function of each of the numerous keys arranged on the remote control in order to fully enjoy the contents and services.

Also, because of the large number of keys on the remote control, it may be difficult for the user to manipulate the remote control while keeping his/her eyes fixed on the TV screen (blind control), and the user may have to turn his/her eyes towards the remote control every time a manipulation is made on the remote control. As such, manipulating the remote control may incur many distractions for a user viewing a content.

Thus, there is a demand for minimizing the number of keys on a remote control intended for using various content services, as this would allow users to readily learn how to use the remote control and allows blind control when manipulating the remote control.

Furthermore, together with a remote control that allows blind control, there is also a demand for an apparatus capable of processing the control signals received from the remote control.

SUMMARY

The invention has been made to address at least the disadvantages and problems described above, and to provide at least the advantages described below. An aspect of the invention provides an apparatus and a method for providing media services with which various media services can be provided even though the remote control has few key or not key.

An embodiment of the invention provides an apparatus for providing a media service while outputting a content. The apparatus may include: a processor; a memory configured to store one or more program instructions executed by the processor; and a control signal receiver unit configured to receive from a remote control a control signal resulting from a key input made by a user, where the program instructions determine whether the key input is a normal input or a force input by comparing a sensing level, which is associated with a pressure or an area by which the user presses the key, with a preset value; identify the content outputted on the screen when the control signal is received, in the event that the key input is a force input; and execute an operation different from an operation of a normal input for the key, according to a combination of the identified content and the force input.

The key can include at least one of a navigation key, a decision key, or a function key, where the navigation key is related to a directional key, and the one or more program instructions may execute an operation corresponding to an attribute different from an attribute originally designated to the selected key if a key is selected with a sensing level greater than or equal to a preset pressure or area.

The sensing levels can include a first sensing level and a second sensing level, the first sensing level associated with a normal input for executing an operation corresponding to an original attribute of the selected key, and the second sensing level associated with a force input for executing an operation different from the original attribute of the key.

The one or more program instructions can identify the content outputted on the screen, when the second sensing level is included in the control signal.

The one or more program instructions can identify whether the content is a live program or an on-demand program, and in cases where the identified content is a live program and a sensing level greater than or equal to a preset pressure or area is included in the control signal, can output at least one of a program schedule, a popular channel list, a preferred channel list, or a recently viewed channel list.

The one or more program instructions can identify whether the content is a live program or an on-demand program, and in cases where the identified content is an on-demand program and a sensing level greater than or equal to a preset pressure or area is included in the control signal, can output at least one of a VOD list, a popular VOD list, or a preferred genre VOD list.

The selected key can be a navigation key or a decision key.

The one or more program instructions can output an identification image for identifying a force input on the screen, if the control signal includes the second sensing level.

The one or more program instructions can output an icon, corresponding to a function selectable by a normal input of a navigation key, on the screen the icon outputted adjacent to the identification image.

There can be a plurality of second sensing levels, and when the control signal includes one of the plurality of second sensing levels, the one or more program instructions can output an icon corresponding to a function corresponding to the second sensing level included in the control signal, with the icon outputted on the screen for a preset duration of time.

The remote control can be equipped with a touchscreen, on which a plurality of keys may be arranged, and the control signal can include the planar coordinates of the selected key and depth information regarding the pressure or area by which the key is selected.

The apparatus for providing a media service can be a set-top box that is configured to receive and output broadcast signals provided by a content provider system.

Another embodiment of the invention provides a method of processing the control signal of a remote control at an apparatus for providing a media service. The method may include: outputting a content on a screen; receiving from the remote control a control signal resulting from a key input made by a user; determining whether the key input is a normal input or a force input by comparing a sensing level, which is associated with a pressure or an area by which the user presses the key, with a preset value; identifying the content outputted on a screen when the control signal is received, when the key input is a force input; and executing an operation different from an operation of a normal input for the key according to a combination of the identified content and the force input.

Yet another embodiment of the invention provides a computer program stored in a computer-readable recorded medium for performing the method described above.

According to an embodiment of the invention, it is possible to provide a greater variety of services even with a smaller number of keys, as the apparatus for providing media services can output a different function or screen for not only each normal input but also each force input provided from the remote control.

Also, during a general software upgrade of the media system, it is not necessary to upgrade the software of the remote control, so that the remote control can be made to have a simpler structure, and the manufacturing cost can be lowered.

BRIEF DESCRIPTION OF DRAWINGS

The aspects, features, advantages and embodiments of the invention will be more apparent from the following detailed description taken in conjunction with reference to the accompanying drawings, in which.

DETAILED DESCRIPTION

In the present specification, an expression used in the singular encompasses the expression of the plural, unless it has a clearly different meaning in the context. In the present specification, terms such as "comprising" or "including," etc., should not be interpreted as meaning that all of the elements or steps are necessarily included. That is, some of the elements or steps may not be included, while other additional elements or steps may be further included. Also, terms such as "unit" or "module," etc., refers to a unit subject that processes at least one function or action, and such unit subject can be implemented as hardware or software or a combination of hardware and software.

Various embodiments of the present invention are described below in more detail with reference to the accompanying drawings.

Figure 1:
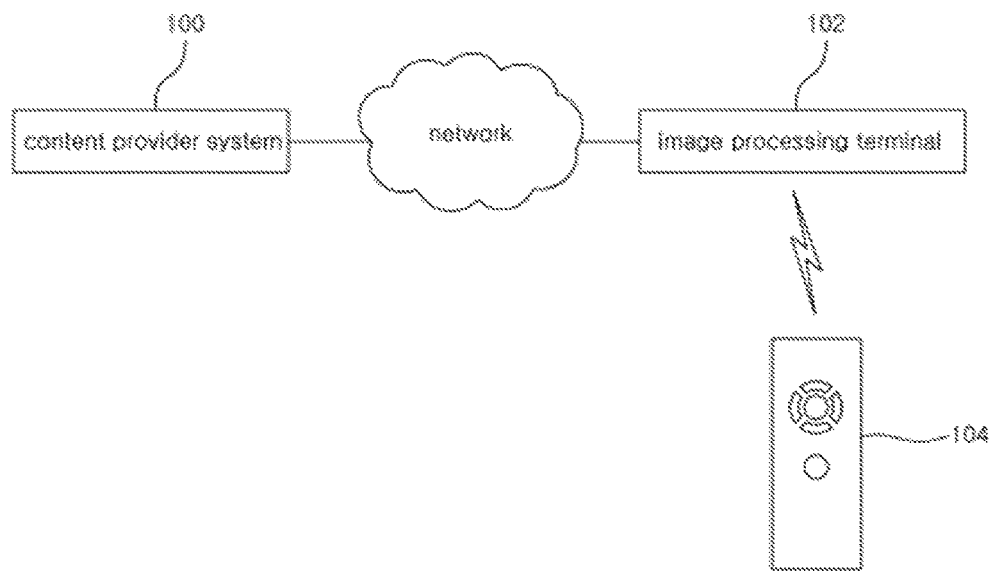
FIG. 1 illustrates the composition of a media service provider system according to an embodiment of the invention.

FIG. 1 illustrates the composition of a media service provider system according to an embodiment of the invention.

As illustrated in FIG. 1, a media service provider system according to this embodiment can include a content provider system 100 and an image processing terminal 102 connected over a network with the content provider system 100.

In this embodiment, "media" encompasses live programs, on-demand programs, games, shopping, etc., provided by a broadcasting provider but is not limited thereto.

In the descriptions below, an apparatus for providing media services according to this embodiment may be referred to as an image processing terminal in that it outputs contents that include images received over a network or pre-stored images.

The descriptions that follow also may refer to the apparatus for providing media services as a broadcast receiver terminal that receives contents provided by the broadcast provider, this is purely for the sake of convenience. Any image processing terminal that connects with a remote control for controlling media services, with a multiple number of sensing levels set for one or more key, would fall within the scope of the invention.

From the perspective of broadcast services, the content provider system 100 can be a headend, and may provide live programs or on-demand programs according to a preset schedule.

The content provider system 100 may convert audio and video signals (AV signals) for various broadcast channels into a preset format, and may transmit the converted broadcast signals to the image processing terminal 102.

Also, the content provider system 100 can be equipped with a separate communication server (e.g. a return path sub) for processing users' requirements via an upstream channel, to thereby provide Internet services and various other communication services.

An image processing terminal 102 according to this embodiment may receive a control signal from a remote control 104 located nearby, and based on the received control signal, may receive a content from the content provider system 100, output the content, perform various other functions, and alter the screen.

The image processing terminal 102 according to this embodiment can be a typical TV set-top box, but is not limited thereto, and any terminal that is capable of receiving contents over a network and receiving control signals from a remote control 104 would fall within the scope of the present invention.

According to an embodiment of the invention, the control signal received by the image processing terminal 102 from the remote control 104 can include key information, concerning the key selected by the user, and sensing level information, corresponding to the pressure or area by which the user pressed or touched the key.

Whereas the control signals of a conventional remote control include only the key information, the control signals of the remote control 104 according to an embodiment of the invention may additionally include information regarding one of several sensing levels set for the key.

Thus, even if the same key were selected, the image processing terminal 102 may perform a different control procedure depending on the sensing level pertaining to the pressure or area by which the selected key is pressed or touched.

According to the present embodiment, in cases where a key pad is physically implemented on the remote control 104, the key information can include key identification information, and in cases where a touchscreen is provided on the remote control 104 and the keys are implemented by software means, the key information can include the coordinate information of a key.

Preferably, when a control signal containing key information and sensing level information is received from the remote control 104, the image processing terminal 102 may identify the content currently being displayed, and may perform a control procedure corresponding to the control signal and the identified content.

Figure 2:
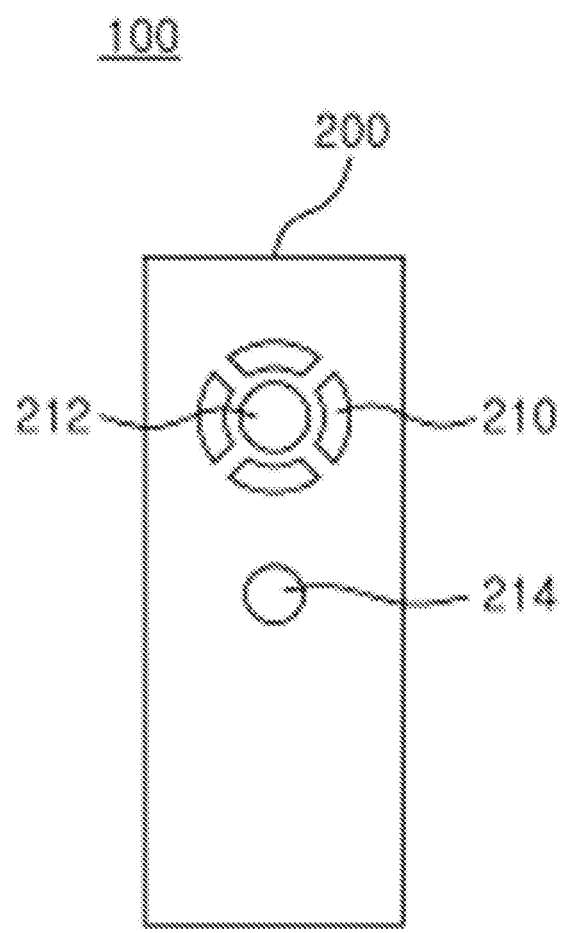
FIG. 2 conceptually illustrates a remote control according to an embodiment of the invention.
Figure 3:
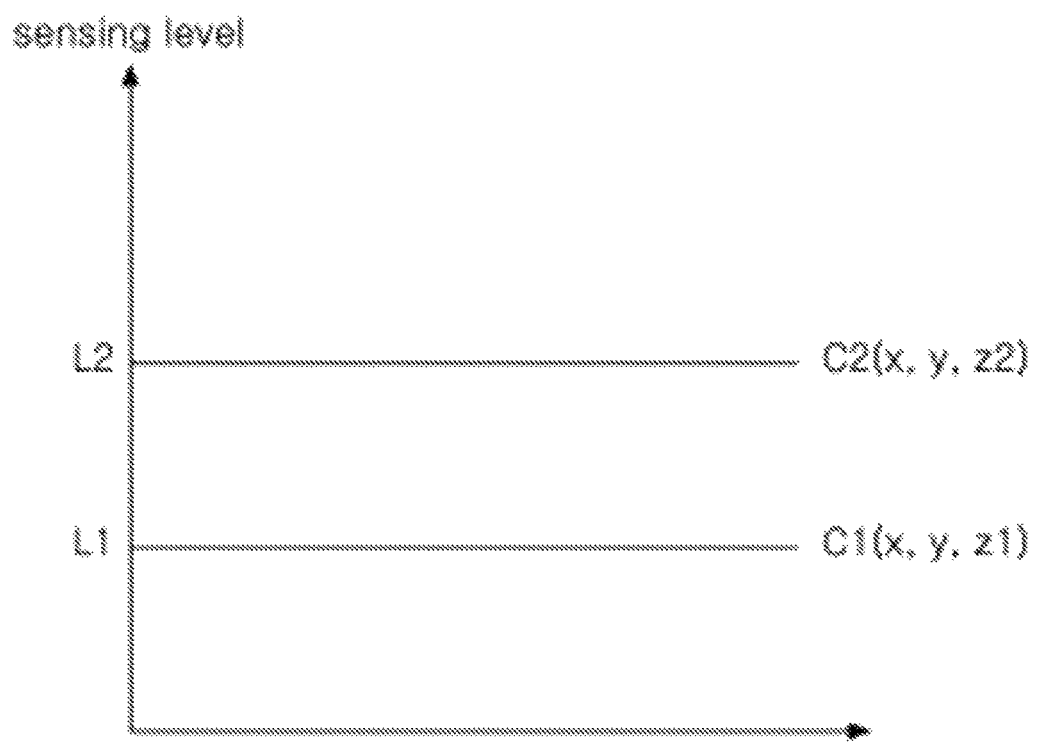
FIG. 3 illustrates the control operations of a remote control according to an embodiment of the invention.

FIG. 2 conceptually illustrates a remote control according to an embodiment of the invention, and FIG. 3 illustrates the control operations of a remote control according to an embodiment of the invention. It should be noted that FIG. 2 illustrates a remote control on which the keys are implemented by software means using a touchscreen.

As illustrated in FIG. 2, the remote control 104 can include a body 200 and several keys formed on the body 200, including: navigation keys 210, which may be related to the upward, downward, left, and right directional keys; a function key 214 for executing a particular operation such as in regard to an ESC key, a home menu, a program schedule selection key, a play control key for fast forward, rewind, stop, and play; and a decision key 212 for deciding on an execution of an operation or a selection of a program such as an OK key (a selection key or a confirm key). While various keys can be provided on the remote control 104, these keys can be classified as navigation keys 210, decision keys 212, and function keys 214.

According to an embodiment of the invention, two or more different control operations can be set for at least one of the keys of the remote control 104, where the different control operations can include operations corresponding to an attribute originally designated to the key and an attribute different from the originally designated attribute.

More specifically, the remote control 104 can transmit to the image processing terminal 102 a control signal for executing a different operation according to the pressure or area by which a key is pressed using a means such as a finger, etc. Here, the sensing level of the remote control 104 may differ according to the pressure or area of pressing the key, and as such, the remote control 104 can transmit a different control signal, according to the sensing level for the key, to the image processing terminal 102.

According to this embodiment, inputs made by a key selection means on the remote control 104 can include a normal input and a force input. A normal input refers to an input associated with a user pressing a key in a typical manner. In this case, a typical operation set for the key of the remote control 104 may be performed in the same manner as for an existing remote control.

For example, if the UP key is pressed, an UP operation may be executed. A force input, implemented for example by pressing a key with greater force or over a larger area compared to a normal input, refers to an input having a sensing level that is greater than the pressure or area by which a key is pressed during a normal input. The control procedure of the image processing terminal 102 for this case may be different from the control procedure of the image processing terminal 102 for a normal input. If a normal input is made for a longer duration of time (i.e. a long press), this operation can still be perceived as a normal input rather than a force input.

Also, it is possible to configure force inputs in multiple levels; this will be described in further detail later on.

According to another embodiment, supposing that the coordinates of a key on the remote control 104 selected with a key selection means are (x, y), then the information on the sensing level can be expressed as a z-axis value. That is, by using 3-dimensional coordinates (x, y, z), both the coordinates of the selected key and the information regarding the sensing level can be expressed at the same time. Of course, it is possible to express the coordinates of a selected key and the information on the sensing level using various methods other than the method of using (x, y, z), and it is also possible to use coordinates of 4 dimensions or higher instead of 3-dimensional coordinates.

Thus, when a user selects a particular key at a particular sensing level, the remote control 104 can transmit a control signal to the image processing terminal 102, with the control signal including the coordinates (x, y) corresponding to the particular key and a z value related to the sensing level. That is, the remote control 104 can transmit a control signal C(x, y, z) to the image processing terminal 102.

For example, if the user selects a navigation key 210 corresponding to a right directional key with a first sensing level (normal input), then the remote control 104 may transmit a control signal C1 having coordinates (x, y, z1) to the image processing terminal 102, and if the user presses the navigation key 210 with a greater force, for example selecting the navigation key 210 with a second sensing level (force input), then the remote control 104 may transmit a control signal C2 having coordinates (x, y, z2) to the image processing terminal 102.

Here, the image processing terminal 102 may perform a different control procedure depending on the control signal.

The image processing terminal 102 according to this embodiment may identify the content currently being displayed, as well as the control signal containing a sensing level, so as to perform a different operation depending on the identified content even when the control signal is the same.

For example, if the decision key 212 is inputted while a live program is being viewed, and the input is recognized as a normal input, the image processing terminal 102 may output detailed information (e.g. running time, etc.) of the program currently being viewed or information on programs provided on adjacent channels.

On the other hand, if a force input is made on the decision key 212 while a live program is being viewed, the image processing terminal 102 can output a live program guide, such as the program schedule for live programs, a popular program list, a preferred channel list, or a recently viewed channel list.

Generally, the output of a program schedule, a popular channel list, a preferred channel list, or a recently viewed channel list may be made by selecting a function key 214 on the remote control or by selecting a submenu from a home menu.

According to this embodiment, entering a force input on the decision key 212 can trigger the same procedure as that implemented by inputting the function key 214. Furthermore, it is possible to allow a user to access a desired service with a fewer number of keys provided.

As such, a force input according to this embodiment can enable the decision key 212 to trigger the same attribute as the function key 214.

According to another embodiment, a multiple number of sensing levels can be set for the decision key 212, so that one of a program schedule, a popular channel list, a preferred channel list, and a recently viewed channel list can be selectively outputted depending on the inputted sensing level.

For example, suppose a first to a fourth sensing level is set for a selected key according to the pressure by which the key is pressed. The image processing terminal 102 may recognize a normal input if the decision key 212 is pressed with a pressure (or area) corresponding to the first sensing level, output a program schedule if the key is pressed with a pressure corresponding to the second sensing level, output a popular channel list if the key is pressed with a pressure corresponding to the third sensing level, and output a preferred channel list if the key is pressed with a pressure corresponding to the fourth sensing level.

Figure 4A:
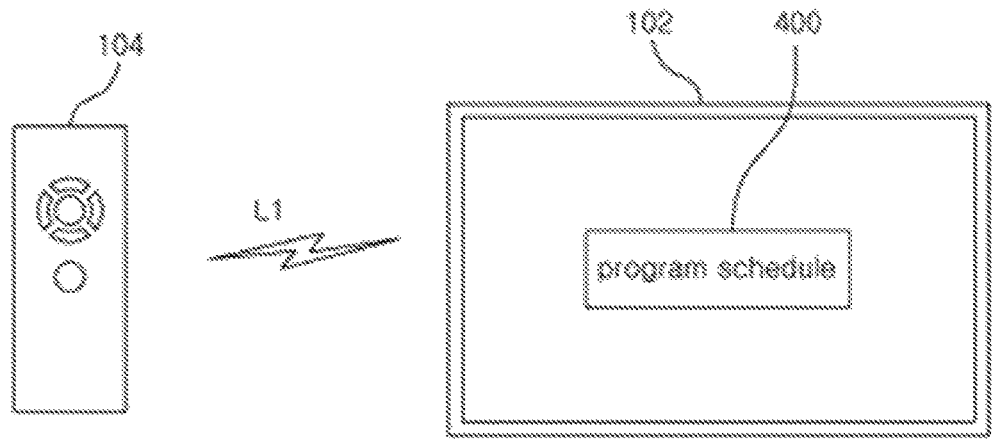
FIG. 4A and FIG. 4B illustrates images that may be outputted when different force inputs are made, according to an embodiment of the invention.
Figure 4B:
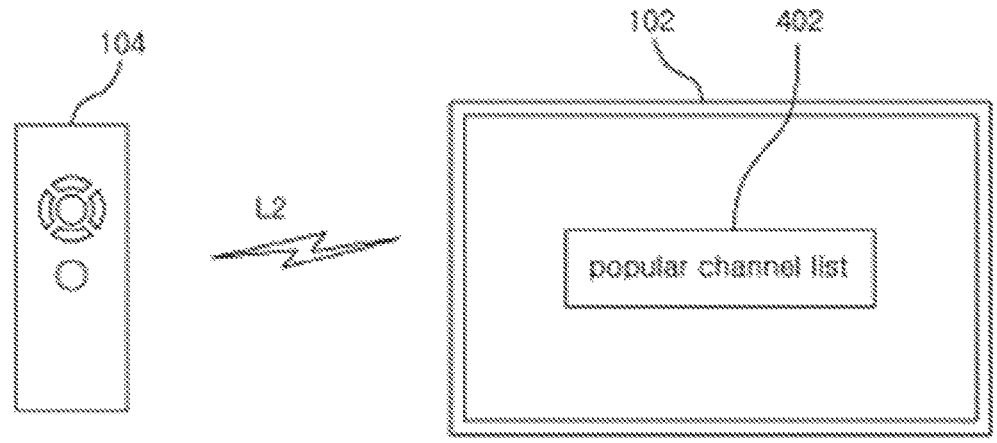

FIG. 4A and FIG. 4B illustrates images that may be outputted when different force inputs are made, according to an embodiment of the invention.

As illustrated in drawing FIG. 4A, when the user enters a force input corresponding to the second sensing level while viewing a live program, the image processing terminal 102 can output an icon 400 for the program schedule, which would be shown if an input of the second sensing level were to be made, on the screen for a certain duration of time.

That is, when the user enters a force input, the image processing terminal 102 may output an image on the screen by which the function performed for the force input can be identified.

Also, as illustrated in drawing FIG. 4B, when the user enters a force input corresponding to the third sensing level while viewing a live program, the image processing terminal 102 can output an icon 402 for the popular channel list, which would be shown if an input of the third sensing level were to be made, on the screen for a certain duration of time.

Further, when the user enters a force input corresponding to the fourth sensing level while viewing a live program, the image processing terminal 102 can output an icon for the preferred channel list, which would be shown if an input of the fourth sensing level were to be made, on the screen for a certain duration of time.

On the other hand, if a key is configured to have sensing levels for a normal input and only one force input (i.e. two sensing levels), then the image processing terminal 102 can provide access to one of a multiple number of services as soon as a force input is made on the decision key 212.

Figure 5:
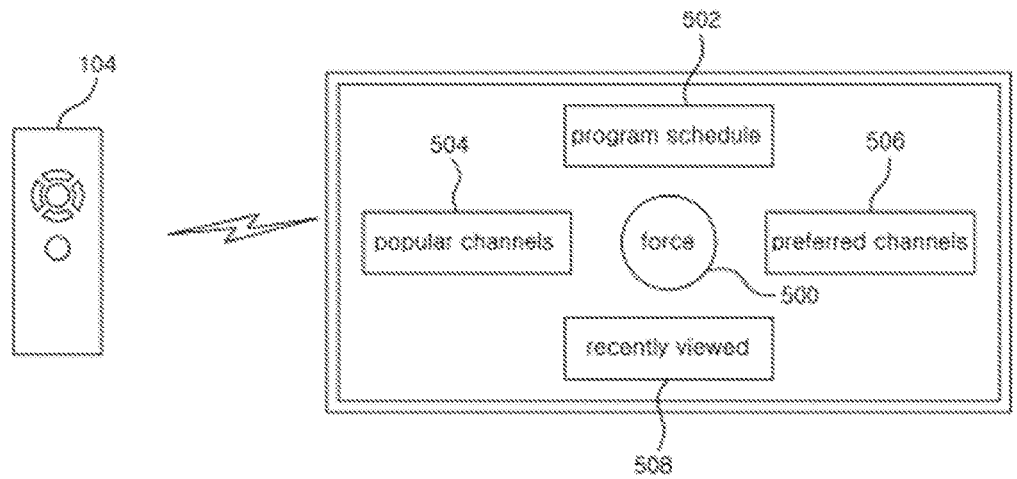
FIG. 5 illustrates images that may be outputted when a single force input is made, according to an embodiment of the invention.

As illustrated in FIG. 5, when a force input is recognized, the image processing terminal 102 may display an image 500 on the screen that informs the user that a force input has been made, and may display a program schedule icon 502, a popular channel list icon 504, a preferred channel list icon 506, and a recently viewed channel list icon 508 arranged in different directions with respect to the image 500.

Subsequently, if an input is made (e.g. a normal input) on a key corresponding to a direction, by way of the navigation keys 210, then the function selected by the user may be executed.

According to this embodiment, even if only a few number of keys are provided on the remote control 104, the user can access various services by using force inputs by themselves or by using combinations of force inputs and normal inputs.

A force input on the decision key 212 entered during use of an on-demand service can be applied in various ways according to the content currently being displayed.

For example, a normal input on the decision key 212 entered while a VOD list is being outputted may be recognized as the selection of a program item which is currently highlighted or at which the cursor is currently positioned.

However, if there is a force input on the decision key 212 while in the above state, the image processing terminal 102 may output a PIP (picture-in-picture) for the program at which the cursor is positioned.

Also, whereas the decision key 212 may mainly be used to output detailed information for the program being played if it is pressed during a showing of an on-demand program, the image processing terminal 102 can output an on-demand program list when a force input on the decision key 212 is entered.

Moreover, when a force input is entered on the decision key 212, the image processing terminal 102 can also output a popular VOD list or a list of VOD for a genre preferred by the user.

As described above, the image processing terminal 102 can perform a different control procedure depending on the content currently displayed, even though the same force input is made on the decision key 212.

The descriptions above referred to accessing different services by using one of multiple force inputs for the decision key 212 or by using a single force input followed by a normal input on a navigation key 210.

However, the invention is not thus limited; for instance, a force input on one of the navigation keys 210 can enable the navigation key 210 to operate as a function key 214.

For example, while a live program is being displayed, if a force input is entered with the upper navigation key 210, the image processing terminal 102 can output a program schedule, and if a force input is entered with the left navigation key 210, the image processing terminal 102 can output a popular channel list. Also, if a force input is entered with the right navigation key 210, a preferred channel list can be outputted, and if a force input is entered with the lower navigation key 210, a recently viewed channel list can be outputted.

According to the present embodiment, the force input can be used to apply attributes analogous to those of the function key 214 onto not only the decision key 212 but also the navigation keys 210, depending on the content currently being displayed.

In short, the remote control 104 of the present embodiment may sense the touch area, touch pressure, etc., of the key selection means to determine the sensing level and then transmit a control signal to the image processing terminal 102 with the information regarding the determined sensing level included in the control signal, at which the image processing terminal 102 may execute a different operation according to the sensing level.

The sensing level obtained from the pressing of the key can be determined if the pressure or area continues for a preset duration of time or longer.

Also, if the level corresponding to the touch of the key selection means does not directly match a preset sensing level but lies between particular levels, the level can be determined to be one of the particular levels. More specifically, the level can be determined as the upper or as the lower of the particular levels.

Whereas the descriptions above referred to expressing the coordinates as 3-dimensional coordinates (x, y, z), it is also possible to express the coordinates as 4-dimensional coordinates (x, y, z, t) such as by designating separate coordinates for the area and the pressure. That is, more than one parameter can be related to the sensing level.

The conventional remote control only allows for normal inputs on the keys, so that only one function can be matched with each key. Thus, a considerably large number of keys may have to be placed on the remote control, resulting in a complicated structure for the remote control and increased inconvenience on the part of the user.

In contrast, the remote control 104 according to an embodiment of the invention can provide not only normal inputs but also force inputs, so that multiple functions can be matched with each key. Therefore, the various functions of the image processing terminal 102 can be executed with a minimal number of keys on the remote control 104, allowing a simpler structure for the remote control 104 and more convenient use for the user.

A description is provided below, with reference to FIG. 6, on an image processing terminal according to the present embodiment.

Figure 6:
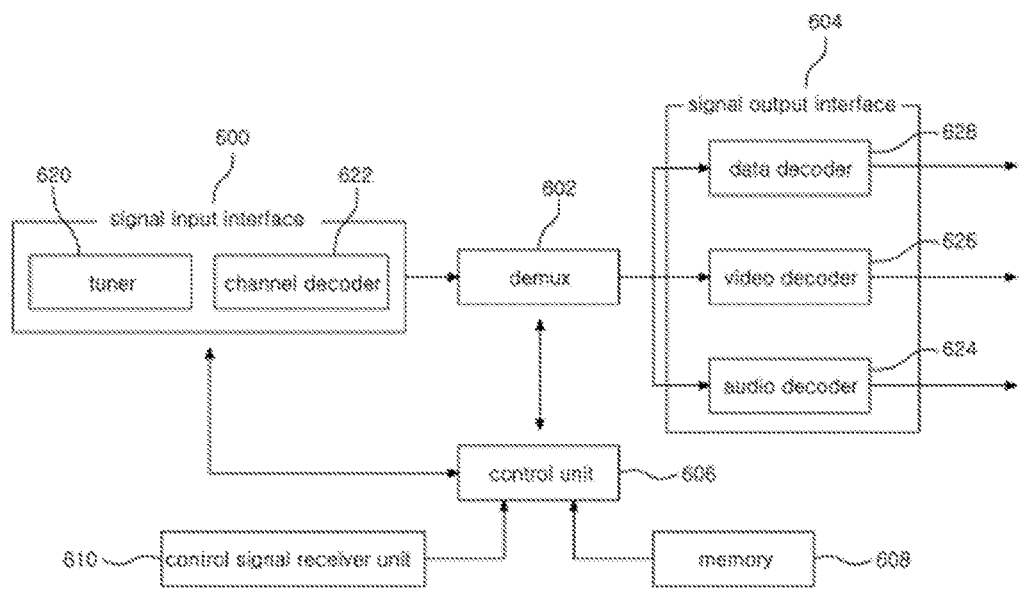
FIG. 6 illustrates the detailed composition of an image processing terminal according to an embodiment of the invention.

As illustrated in FIG. 6, an image processing terminal 102 according to this embodiment can include a signal input interface 600, a demux 602, a signal output interface 604, a control unit 606, a memory 608, and a control signal receiver unit 610.

The signal input interface 600 may include a tuner 620, which receives broadcast signals (the program on the channel selected by the user), and a channel decoder 622, which extracts the channel desired by the user from among the received broadcast signals under the control of the control unit 606.

The broadcast signal compressed (or encoded) according to a compression standard of a particular protocol can be any one of a video signal, audio signal, or data signal, or a combination thereof, and these may be extracted and separated by the demux 602 and sent to the signal output interface 604.

The signal output interface 604 can include a decoder corresponding to each signal; more specifically, an audio decoder 624, a video decoder 626, and a data decoder 628. For example, the demux 602 may extract the audio signal from among the broadcast signal of the desired channel, and transfer the audio signal to the audio decoder 624 of the signal output interface 604, at which the audio decoder 624 may decode the audio signal and transfer the signal in an analog form to the user's speaker.

Similarly, a video signal may be decoded by the video decoder 626 of the signal output interface 604 and transferred to a display unit such as a TV set. If the broadcast signal is a combined signal of a video signal and a data signal, the data signal may be extracted and classified by the demux 602 and transmitted to the data decoder 628, the data decoder 628 may decode the compressed data broadcast data signal, and the decoded data signal may be matched according to the video signal and the graphic overlay and transferred to the display unit.

The control unit 606 can include a CPU (central processing unit) or other virtual machine, etc., capable of executing a computer program, and can be defined as a typical processor.

The control unit 606 may have the tuner 620 tuned to the requested channel according to the user's channel selection request, process the broadcast signal received through the selected channel, and output the signal on the display unit.

Also, the control unit 606 may process a broadcast signal received over a network and output it on the display unit.

The memory 608 may serve one or more program instructions that can be executed by the control unit 606.

The memory 608 can include a non-volatile storage device such as a fixed hard drive or a detachable storage device. A detachable storage device can include a compact flash unit, a USB memory stick, etc. The memory 608 can also include volatile memory such as various random access memory.

Also, according to an embodiment of the invention, the memory 608 may store program instructions for processing the control signals received via the control signal receiver unit 610.

As described above, the control signal received through the remote control 104 may include key information, regarding the key selected by the user, and sensing level information.

The control unit 606, by executing the program instructions, may identify the current mode, i.e. the content currently being displayed, and may perform a control procedure according to the control signal containing the identified content and the sensing level.

As described above, multiple sensing levels can be set for one key, and the control unit 606 may determine whether an input is a normal input or a force input according to the received sensing level.

More specifically, there can be a multiple number of force inputs, and the control unit 606 may determine whether a key input entered by the user is a normal input or one of the force inputs to perform a control procedure correspondingly.

In the present embodiment, a touch on the remote control can be entered by way of a key selection means, in which case setting the sensing levels can involve determining whether or not the key selection means is positioned nearby and determining the pressure after a touch is made.

Figure 7A:
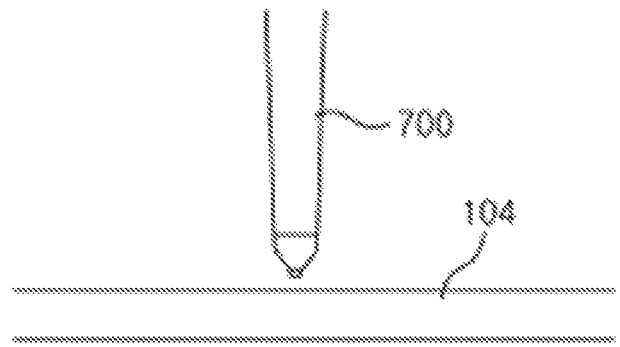
FIG. 7A to FIG. 7C illustrate touch inputs that can be made with a key selection means according to an embodiment of the invention.
Figure 7B:
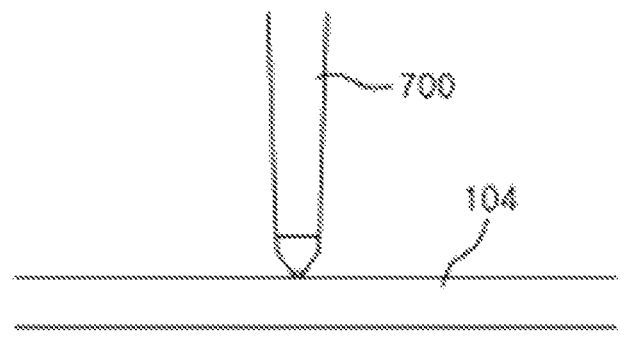
Figure 7C:
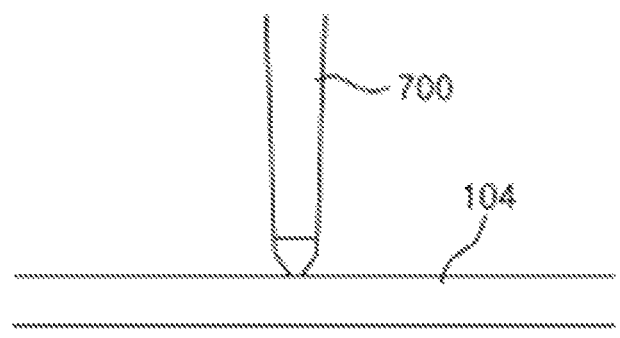

FIG. 7A to FIG. 7C illustrate touch inputs that can be made with a key selection means according to an embodiment of the invention.

The settings for the individual keys of the remote control 104 can include a first level for sensing the approaching near of the key selection means 700, as illustrated in drawing FIG. 7A, a second level for sensing the key selection means 700 making a touch with a value lower than a preset sensing level (a normal input), as illustrated in drawing FIG. 7B, and a third level for sensing the key selection means 700 making a touch with a value greater than or equal to the preset sensing level (a force input), as illustrated in drawing FIG. 7C.

That is, the individual keys of the remote control 104 can be set to have multiple sensing levels. Of course, the sensing levels can be set for all of the keys, but in some cases, some of the keys can be set to have only one sensing level. Here, the sensing level can be determined based on a change in capacitance.

The sensing level can be determined when the key selection means 700 presses a key for a preset duration of time or longer.

Figure 8:
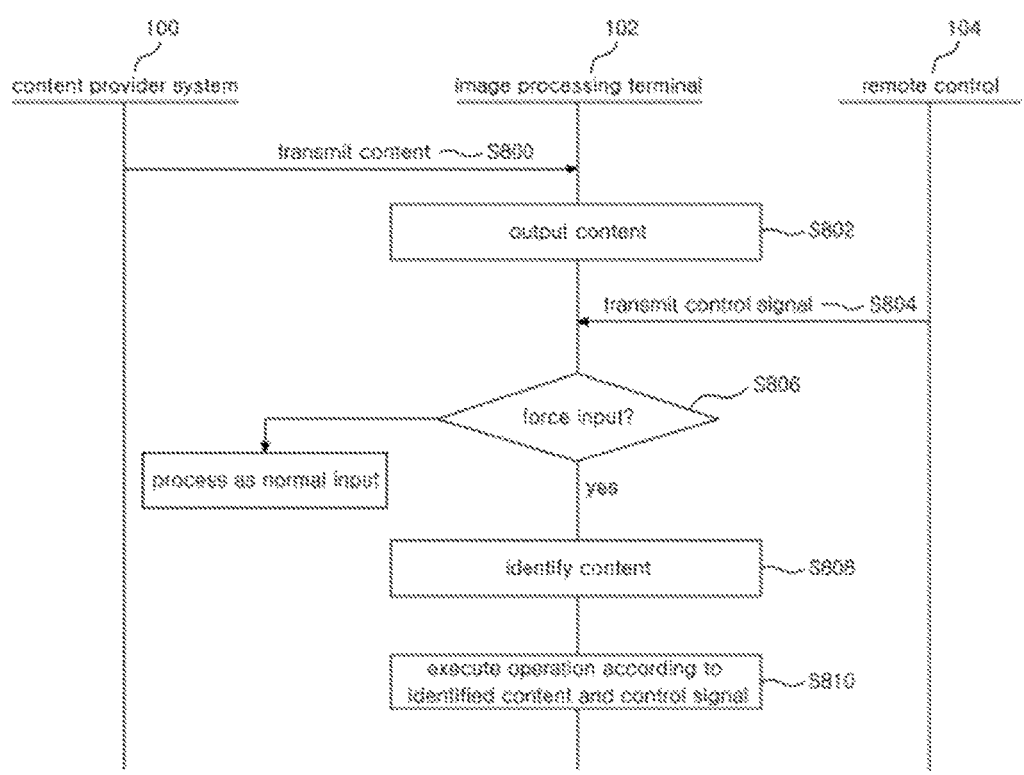
FIG. 8 is a flow diagram illustrating procedures for providing media services according to an embodiment of the invention.

FIG. 8 is a flow diagram illustrating procedures for providing media services according to an embodiment of the invention.

Referring to FIG. 8, the content provider system 100 may transmit a content to the image processing terminal 102 (step 800), and the image processing terminal 102 may output the received content through a display unit (step 802).

The remote control 104 may transmit a control signal, according to a user's selection, to the image processing terminal 102 (step 804).

The control signal transmitted by the remote control 104 may include key information and the sensing level information for the selected key.

From the sensing level information included in the control signal, the image processing terminal 102 may determine whether or not the user's input is a force input (step 806).

In step 806, the image processing terminal 102 may determine whether the control signal is for a normal input or a force input, and if multiple sensing levels are set for force inputs, may determine which of the multiple force inputs has been entered.

In the case of a force input, the image processing terminal 102 may identify the content currently being displayed (step 808).

Afterwards, the image processing terminal 102 may execute an operation according to the identified content and the received control signal (step 810).

In step 810, the image processing terminal 102 can output an image on the screen by which it may be identified that the input is a force input.

Here, if multiple types of force input can be entered for a single key, the image processing terminal 102 can output an image (icon) for a certain duration of time that allows the user to identify the function that would be executed in accordance with the sensing level currently inputted.

Also, in cases where a single force input is supported, the image processing terminal 102 can output an image that allows identification of a force input as well as icons for identifying a multiple number of functions that can be selected with the navigation keys, adjacent to the identification image.

The components of the embodiments described above can also be easily understood from the perspective of processes. That is, the components can each be understood as a process. Likewise, the processes of the embodiments described above can also be easily understood from the perspective of an apparatus' components.

The technical features described above can be implemented in the form of program instructions that may be performed using various computer means and can be recorded in a computer-readable medium. Such a computer-readable medium can include program instructions, data files, data structures, etc., alone or in combination. The program instructions recorded on the medium can be designed and configured specifically for the present invention or can be a type of medium known to and used by the skilled person in the field of computer software. Examples of a computer-readable medium may include magnetic media such as hard disks, floppy disks, magnetic tapes, etc., optical media such as CD-ROM's, DVD's, etc., magneto-optical media such as floptical disks, etc., and hardware devices such as ROM, RAM, flash memory, etc. Examples of the program of instructions may include not only machine language codes produced by a compiler but also high-level language codes that can be executed by a computer through the use of an interpreter, etc. The hardware mentioned above can be made to operate as one or more software modules that perform the actions of the embodiments of the invention, and vice versa.

The embodiments of the invention described above are disclosed only for illustrative purposes. A person having ordinary skill in the art would be able to make various modifications, alterations, and additions without departing from the spirit and scope of the invention, but it is to be appreciated that such modifications, alterations, and additions are encompassed by the scope of claims set forth below.

DESCRIPTION OF REFERENCE NUMERALS

100: content provider system
102: image processing terminal
104: remote control
210: navigation key
212: function key
214: decision key

What is claimed is:

1. An apparatus for providing a media service configured to output a content, the apparatus comprising:
  a processor;
  a memory configured to store one or more program instructions executed by the processor; and
  a control signal receiver unit configured to receive from a remote control having a key a control signal resulting from a key input made by a user,
  wherein the key is a navigation key associated with a navigation attribute and a navigation operation, a decision key associated with a decision attribute and a decision operation, or a function key associated with a function attribute and a function operation when the key input is a normal input;
  wherein the one or more program instructions
  determine whether the key input is a normal input associated with a first sensing level or a force input associated with a second sensing level by comparing a sensing level of the key input with a preset value, the sensing level of the key input being associated with a pressure with which the user presses the key,
  in response to a force input associated with a second sensing level, identify the content output on a screen to the user as a first program content or a second program content provided by a content provider system; and
  execute an operation that does not have an attribute associated with a normal input for the key and that depends on a combination of the identified content and the force input.

2. The apparatus for providing a media service according to claim 1, wherein
  the operation is displaying an interface for searching a program corresponding to the identified content.

3. The apparatus for providing a media service according to claim 1, wherein the first program content is a live program and the second program content is an on-demand program.

4. The apparatus for providing a media service according to claim 1, wherein
  the operation is displaying at least one of a program schedule, a popular channel list, a preferred channel list, or a recently viewed channel list, when the identified content is a live program.

5. The apparatus for providing a media service according to claim 4, wherein the user selects a navigation key or a decision key as the key input.

6. The apparatus for providing a media service according to claim 1, wherein
  the operation is displaying at least one of a VOD list, a popular VOD list, or a preferred genre VOD list, when the identified content is an on-demand.

7. The apparatus for providing a media service according to claim 1, wherein the one or more program instructions output on the screen an identification image for identifying a force input, when the control signal includes the second sensing level.

8. The apparatus for providing a media service according to claim 7, wherein the one or more program instructions output on the screen an icon corresponding to a function selectable by a normal input of a navigation key, the icon outputted adjacent to the identification image.

9. The apparatus for providing a media service according to claim 1, wherein the apparatus accommodates a plurality of second sensing levels,
and when the control signal includes one of the plurality of second sensing levels, the one or more program instructions output on the screen an icon corresponding to a function corresponding to the second sensing level included in the control signal, the icon outputted for a preset duration of time.

10. The apparatus for providing a media service according to claim 1, wherein the remote control is equipped with a touchscreen, the touchscreen having a plurality of keys arranged thereon,
and the control signal includes planar coordinates of the selected key and depth information regarding the pressure with which the key is selected.

11. The apparatus for providing a media service according to claim 1, wherein the apparatus is a set-top box configured to receive and output broadcast signals provided by a content provider system.

12. A method for processing a control signal of a remote control at an apparatus for providing media services, the method comprising:
outputting a content on a screen;
receiving from the remote control having a key a control signal resulting from a key input made by a user;
determining whether the key input is a normal input associated with a first sensing level or a force input associated with a second sensing level by comparing a sensing level of the key input with a preset value, the sensing level of the key input being associated with a pressure with which the user presses the key;
in response to a force input associated with a second sensing level, identifying the content output on a screen to the user as a first program content or a second program content provided by a content provider system; and
executing an operation that does not have an attribute associated with a normal input for the key and that depends on a combination of the identified content and the force input,
wherein the key is a navigation key associated with a navigation attribute and a navigation operation, a decision key associated with a decision attribute and a decision operation, or a function key associated with a function attribute and a function operation when the key input is a normal input.

13. A computer program stored in a non-transitory computer-readable recorded medium for performing the method of claim 12.

14. The apparatus for providing a media service according to claim 6, wherein the user selects a navigation key or a decision key as the key input.

15. The apparatus for providing a media service according to claim 1, wherein the one or more program instructions executes an operation different from the operation associated with a normal input and a force input associated with a second sensing level in response to a force input associated with a third sensing level.

16. The apparatus for providing a media service according to claim 15, wherein the one or more program instructions executes an operation different from the operation associated with a normal input, a force input associated with a second sensing level, and a force input associated with a third sensing level, in response to a force input associated with a fourth sensing level.

17. The apparatus for providing a media service according to claim 16, wherein the one or more program instructions outputs a program schedule when the force input is associated with a second sensing level, a popular channel list when the force input is associated with a third sensing level, and a preferred channel list when the force input associated with a fourth sensing level.

18. The method for processing a control signal of a remote control at an apparatus for providing media services according to claim 12, wherein the first program content is a live program and the second program content is an on-demand program.

19. The method for processing a control signal of a remote control at an apparatus for providing media services according to claim 18, wherein the operation is displaying an interface for searching a program corresponding to the identified content.

20. The method for processing a control signal of a remote control at an apparatus for providing media services according to claim 12,
wherein the operation is displaying at least one of a program schedule, a popular channel list, a preferred channel list, or a recently viewed channel list, when the identified content is a live program, and
wherein the user selects a navigation key or a decision key as the key input.

* * * * *